No. 813,547. PATENTED FEB. 27, 1906.
C. FENSKY.
NON-REFILLABLE BOTTLE.
APPLICATION FILED MAR. 9, 1905.

Attest,
Edw. M. Harrington
C. Russell

Inventor,
Charles Fensky.
By Higdon, Longan & Hopkins.
Atty s.

UNITED STATES PATENT OFFICE.

CHARLES FENSKY, OF ST. LOUIS, MISSOURI.

NON-REFILLABLE BOTTLE.

No. 813,547.　　　　Specification of Letters Patent.　　　　Patented Feb. 27, 1906.

Application filed March 9, 1905. Serial No. 249,210.

*To all whom it may concern:*

Be it known that I, CHARLES FENSKY, a citizen of the United States, and a resident of the city of St. Louis, Missouri, have invented certain new and useful Improvements in Non-Refillable Bottles, of which the following is a specification containing a full, clear, and exact description, reference being had to the accompanying drawings, forming a part hereof.

My invention relates to improvements in non-refillable bottles; and it consists in the novel features herein shown, described, and claimed.

Figure 1:
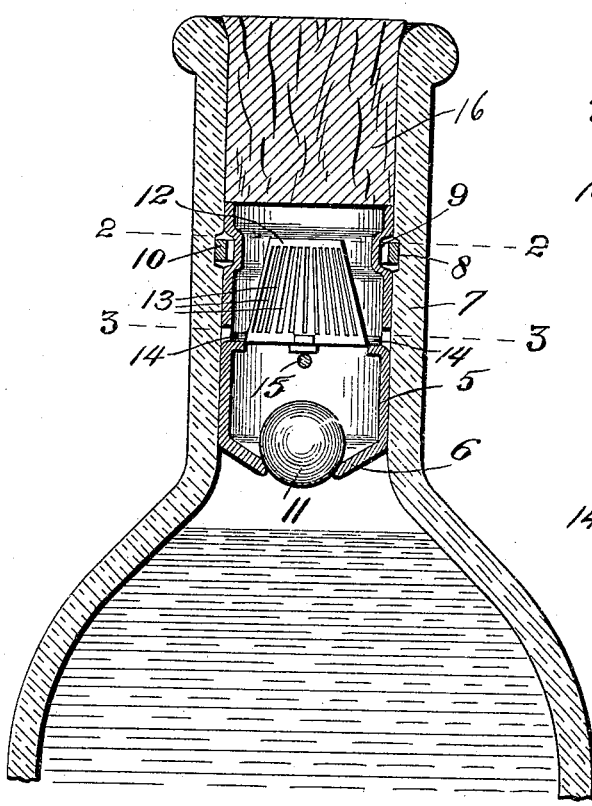
Figure 2:
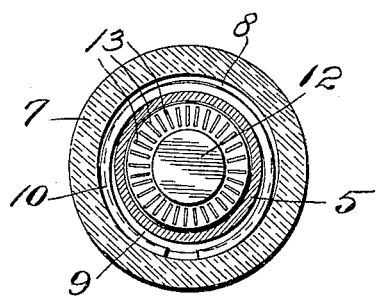
Figure 3:
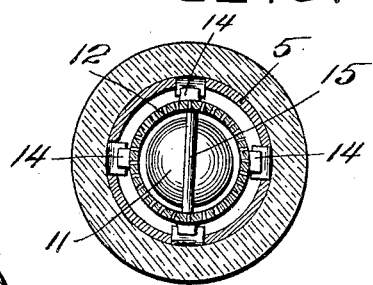
Figure 4:
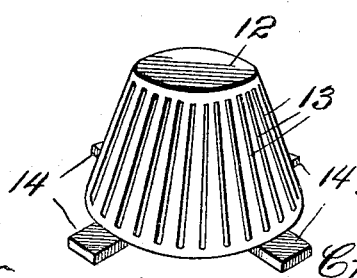

In the drawings, Figure 1 is a vertical central section through the neck of a bottle embodying the principles of my invention. Fig. 2 is a horizontal section on the line 2 2 of Fig. 1. Fig. 3 is a horizontal section on the line 3 3 of Fig. 1. Fig. 4 is an enlarged perspective of the valve-shield.

Referring to the drawings in detail, the tubular casing is provided with a valve-seat 6 at its lower end, said casing being adapted to be inserted downwardly into the neck 7 of the bottle. An internal groove 8 is formed in the neck 7 and an external groove 9 is formed in the casing 5. A split spring-ring 10 is placed in the groove 9. A ball-valve 11 is placed upon the valve-seat 6. The valve-protector 12 is conical and has slotted openings 13, and arms 14 extend from the base of the protector into openings in the shell to support the protector and hold it above the valve 11. A pin 15 is transversely arranged in the tubular casing beneath the conical valve-protector and is intended to prevent the ball 11 from passing upwardly into said protector.

It is obvious that when the cork 16 is removed and the bottle turned bottom upward the contents will run out through the openings 13, the valve being unseated, and that when the bottle is righted the valve will be seated and the bottle cannot be refilled.

I claim—

In a non-refillable bottle, a cylindrical valve-casing adapted to be positioned in the neck of the bottle, a valve-seat formed at the lower end of the valve-casing, a ball-valve normally resting on the valve-seat, a conical valve-protector arranged within the valve-casing above the ball-valve, which protector is provided with a continuous series of vertical slots, and a pin arranged transversely in the valve-casing beneath the protector, substantially as specified.

In testimony whereof I have signed my name to this specification in presence of two subscribing witnesses.

CHARLES FENSKY.

Witnesses:
　EDW. M. HARRINGTON,
　JOHN C. HIGDON.